Dec. 30, 1924.  
E. F. WALSH  
1,520,787  
TAIL GATE LATCH AND SPREADER FOR DUMP BODIES ON MOTOR VEHICLES  
Filed Jan. 17, 1920
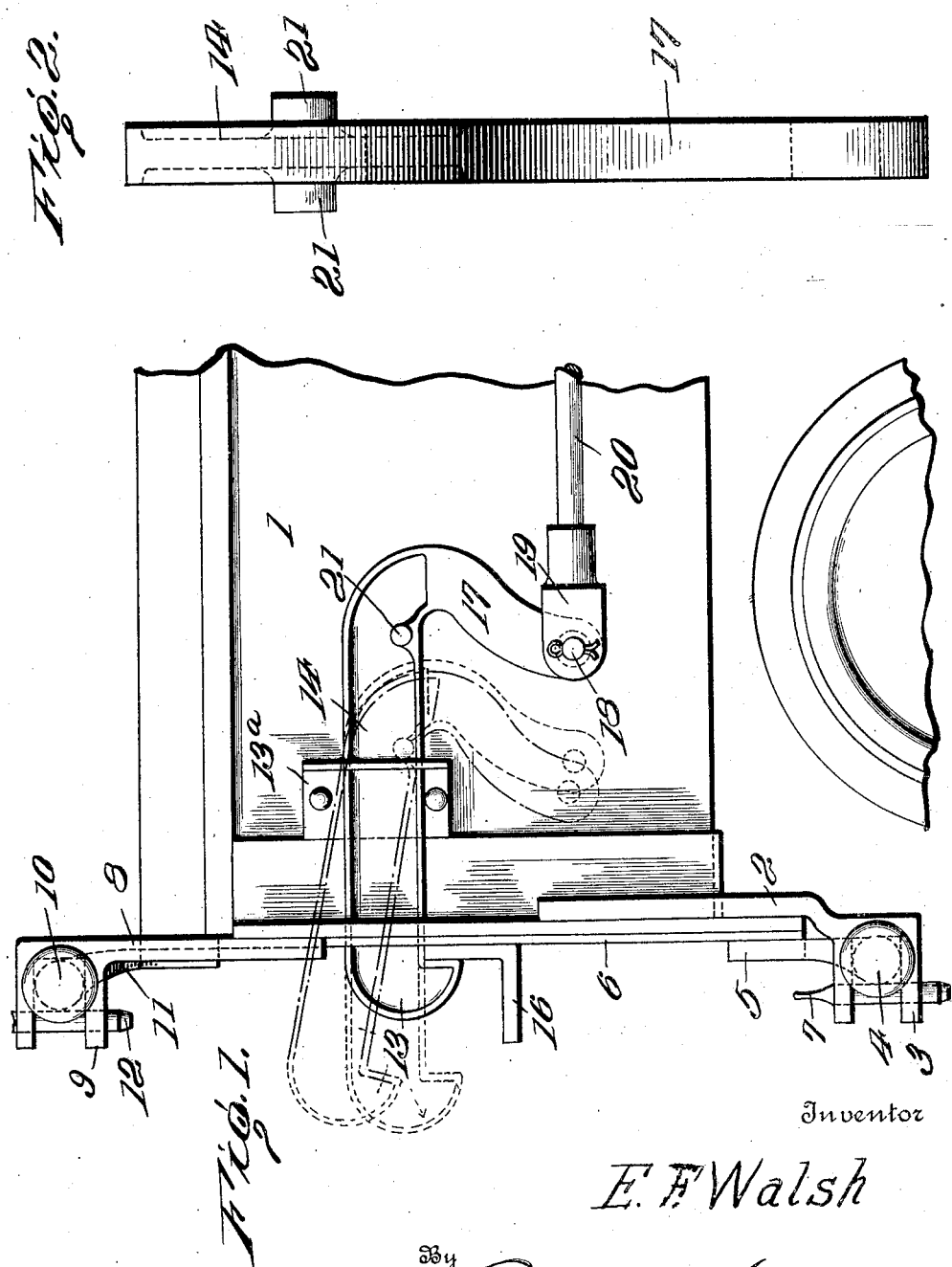
Inventor  
E. F. Walsh  
, Attorney Patented Dec. 30, 1924.

1,520,787

UNITED STATES PATENT OFFICE.

EDWARD F. WALSH, OF MARION, INDIANA, ASSIGNOR TO SUPERIOR BOILER WORKS, OF MARION, INDIANA, A CORPORATION OF INDIANA.

TAIL-GATE LATCH AND SPREADER FOR DUMP BODIES ON MOTOR VEHICLES.

Application filed January 17, 1920. Serial No. 352,115.

*To all whom it may concern:*

Be it known that I, EDWARD F. WALSH, a citizen of the United States, residing at Marion, in the county of Grant and State of Indiana, have invented certain new and useful Improvements in Tail-Gate Latches and Spreaders for Dump Bodies on Motor Vehicles, of which the following is a specification, reference being had therein to the accompanying drawing.

This invention relates to certain new and useful improvements in tail gate latches for dump bodies on motor trucks and more particularly to dumping body motor trucks, the object being to provide a latch which is so constructed that the same can be shifted for releasing the tail gate to allow the same to spread the material or to dump the contents thereof.

A still further object of the invention is to provide a latch which is exceedingly simple and cheap in construction and one which can be readily applied to any of the well known makes of dumping bodies on motor trucks employing an outwardly swinging tail gate.

A further object of the invention is to provide a latch which is so mounted that the same is capable of sliding outwardly from the tail gate to allow the tail gate a predetermined outward movement, the construction being such that when pressure is brought to bear on the latch at this point the latch will swing upwardly out of engagement with the keeper so that the tail gate is free to swing outwardly.

Other and further objects and advantages of the invention will be hereinafter set forth and the novel features thereof defined by the appended claim.

In the drawings:—

Figure 1 is a side elevation of a portion of a dumping body on a motor truck showing the application of my improved construction of tail gate latch thereto.

Figure 2 is an end view of the latch detached.

In the drawing 1 indicates the dumping body of a motor truck which may be of any of the well known constructions now in use and I do not wish to limit myself to the use of my improved construction of latch to any particular construction of body. Extending downwardly from the end of the body are brackets 2 which are provided with bifurcated portions 3 forming bearings for the studs 4 of hinge members 5 which are secured to the end gate 6 by any suitable means. Studs 4 are herein shown secured in the bearings by pins 7 in order to rigidly secure the tail gate in position over the end of the dumping body.

Extending upwardly from the end of the body 1 are brackets 8 provided with bifurcated portions 9 forming bearings for the headed studs 10 which are carried by hinge member 11 secured to the tail gate 6, said headed studs being held within the bifurcated portions of the hinge member by pins 12. By constructing an end gate in this particular manner and mounting the same over the open end of the dumping body on a motor truck, the same can be readily attached or detached and by removing the lower pin 7 the tail gate is free to swing outwardly and upwardly rocking on the pivots 10. When the pins 7 are in position and the pins 12 are removed the tail gate can be swung outwardly and downwardly and by this construction the tail gate can be easily and quickly placed in position on the body of the motor truck or removed therefrom if desired. Secured to the side of the body 1 is an angled member forming a guide 13ª in the slot of which is slidably mounted a latch bar 14 which is provided with a hooked end 13 adapted to engage the keeper bar 16 secured to the tail gate 6 as clearly shown. The inner end of the latch bar 14 is provided with a depending portion 17 having an aperture through which extends a pin 18 on which is mounted the coupling member 19 carried by the end of an operating rod 20 which preferably extends to the front of the vehicle so it will be adjacent the operator's seat and can be operated through any suitable mechanism. The latch bar 14 is provided with oppositely disposed projections 21 which are adapted to engage the guide 13ª when the operating rod 20 is forced backwardly so as to limit the sliding movement of the latch bar within the guide 13 and as shown in dotted lines the latch bar moves out of contact with the keeper 16 so that when the pins 7 are removed the tail gate can rock on the pin 10 within the brackets 8 so as to allow the tail gate of the body which has been moved into raised position to swing upwardly a certain distance so that the contents of the body will gradually pass out through the end thereof in order to allow the same to be spread over a surface when desired. When it is desired to dump the contents quickly after the latch has been moved into the position above described and as shown in dotted lines the operating bar 20 is pushed further to the rear which causes the projections 21 of the latch bar to rock on the guide 13ª as a pivot and the latch bar is raised into the position shown by dotted and dash lines out of the path of travel of the keeper 16 which allows the gate to swing freely outwardly. When the latch is moved into this position the connecting joint of the operating rod is beyond the center of the pivot of the latch which holds the latch in elevated position so as to prevent the same from falling until the pressure is released on the operating rod.

From the foregoing description it will be seen that I have provided an end gate latch for a dumping body on a motor truck which has a sliding and pivoted movement so as to allow the end gate to move a predetermined distance when the latch is reciprocated in order to provide means for allowing the contents of the body to gradually pass out the end of the same whereby the material can be spread, the pivotal movement of the latch moving the latch out of engagement with the keeper of the end gate so that the content is free to pass unobstructed out of the body.

What I claim is:—

The combination with a motor vehicle having a dumping body provided with a pivoted end gate, an angled member secured to the body of the vehicle having a slot forming a guide way, a keeper bar carried by said end gate, a latch slidably mounted in said guide having a hooked outer end adapted to engage said keeper bar, said latch having oppositely disposed lateral projections forming pivots and stops adapted to engage the guide member, said latch having a depending inner end and an operating bar connected to the depending end of said latch for moving said latch in said guide way, the initial movement of said latch in said guide way causing said pivot to be brought into engagement with the guide member and the hooked end of said latch to move out of contact with said keeper bar for limiting the swinging movement of said end gate and the final movement of said operating bar causing said latch to rock on its pivot against the flanged guide member out of the path of travel of said keeper bar for releasing said end gate.

In testimony whereof I hereunto affix my signature in the presence of two witnesses.

ED. WALSH.

Witnesses:
CLINTON MCKEE,
FREDA SANDERS.